United States Patent [19]

Inoue et al.

[11] Patent Number: 5,893,316
[45] Date of Patent: Apr. 13, 1999

[54] BRAKE BOOSTER

[75] Inventors: Hidefumi Inoue; Tohru Satoh, both of Saitama-ken, Japan

[73] Assignees: Jidosha Kiki Co., Ltd., Tokyo; Nissan Motor Co., Ltd., Yokohama, both of Japan

[21] Appl. No.: 08/990,603

[22] Filed: Dec. 15, 1997

[30] Foreign Application Priority Data

Dec. 27, 1996 [JP] Japan ............................ 8-357754
May 16, 1997 [JP] Japan ............................ 9-143299

[51] Int. Cl.⁶ .................................................. F15B 9/10
[52] U.S. Cl. ................................................... 91/369.2
[58] Field of Search ....................... 91/369.2, 369.3, 91/376 R

[56] References Cited

U.S. PATENT DOCUMENTS 3,143,926  8/1964  Stelzer ............................. 91/369.2
3,548,595  12/1970  Pech et al. ...................... 91/369.3
5,031,404  7/1991  Flory et al. ..................... 91/369.2

FOREIGN PATENT DOCUMENTS 59-92242   5/1984   Japan .
61-205858  12/1986  Japan .
8-85442    4/1996   Japan .
2080457    2/1982   United Kingdom .................. 91/369.3

OTHER PUBLICATIONS

Hindhede et al, "Coupling of Springs" in Machine Design Fundamentals (John Wiley & Sons, 1983) pp. 203–204.

Primary Examiner—F. Daniel Lopez
Attorney, Agent, or Firm—Flynn, Thiel, Boutell & Tanis, P.C.

[57] ABSTRACT

A brake booster includes a reaction transmitting means which includes a spring that is compressed when a brake reaction from a reaction disc exceeds a preset load. A holder is mounted on a valve body, and a brake reaction which is transmitted from the reaction disc is accepted by the valve body through the holder. A plate plunger is slidably fitted in the holder to allow a brake reaction which is transmitted to the reaction disc to be transmitted to the reaction transmitting means and the valve plunger through the plate plunger. A larger outer diameter can be chosen for the spring in order to achieve a preferred preset load, and a servo ratio can be freely established by the choice of areas of contact between the reaction disc on one hand and the holder and the plate plunger on the other hand.

4 Claims, 10 Drawing Sheets

BRAKE BOOSTER

FIELD OF THE INVENTION

The invention relates to a brake booster for use in a braking unit of an automobile.

DESCRIPTION OF THE PRIOR ART

A brake booster is known in the art which comprises a valve body slidably disposed within a shell, a valve mechanism mounted on the valve body, an input shaft for driving a valve plunger, which forms part of the valve mechanism, back and forth to thereby switch a flow path in the valve mechanism, an output shaft slidably mounted on the valve body, and a reaction disc interposed between one end of the output shaft and the valve plunger.

In a brake booster of the kind described, a brake reaction applied to the output shaft is transmitted from the reaction disc to a brake pedal through the valve plunger and the input shaft. When a servo ratio of the brake booster is chosen high, or when the brake booster is designed such that a reaction which is transmitted to the brake pedal is reduced, the brake booster can be operated with a reduced force of depression while the maneuverability is degraded in a range in which a braking force of a reduced magnitude is required. On the contrary, when the servo ratio of the brake booster is chosen small, the proportion of a reaction which is transmitted to the brake pedal increases, improving the maneuverability in a range where a braking force of a reduced magnitude is required. On the other hand, a force of depression of a greater magnitude is required in order to obtain an increased output, presenting a difficulty, in particular for a female or aged driver to derive a braking force of an increased magnitude.

Accordingly, there has been proposed a brake booster in which reaction transmitting means including a spring which is compressed when the braking reaction exceeds a preset load is interposed between the reaction disc and the valve plunger to allow a small servo ratio to be obtained during an initial phase of the braking action while an increased servo ratio is obtained during a later phase of the braking action of the brake booster (see Japanese Laid-Open Patent Application No.92,242/84, Japanese Laid-Open Utility Model Application No.205,858/86 and Japanese Laid-Open Patent Application No.85,442/96). With such a brake booster, the servo ratio of the brake booster can be reduced during the initial phase of the braking action to thereby improve the maneuverability in a range where a braking force of a reduced magnitude is required while the servo ratio can be increased during the later phase of the braking action, allowing a braking force of an increased magnitude to be obtained with a force of depression of a reduced magnitude.

It will be noted that when it is desired to preset an optimum load, it is generally necessary that the outer diameter of the spring be increased. As the outer diameter of the spring increases, there arises the need that the inner diameter of a bore in the valve body in which the spring is received must be increased.

Since a brake reaction from the reaction disc is transmitted to the reaction transmitting mechanism including the spring and to the valve body, it follows that when the outer diameter of the spring is increased, thus increasing the area of contact between the reaction disc and the reaction transmitting mechanism, it becomes necessary to increase the outer diameter of the reaction disc to allow an increased area of contact to be provided between the reaction disc and the valve body in order to maintain the servo ratio constant.

However, when the outer diameter of the reaction disc is increased, problems arise that a difficulty may be experienced in forming a constant pressure passage or that the valve body must be increased in size.

On the other hand, if an increase in the outer diameter of the reaction disc is avoided, there results an increase in the servo ratio during the initial phase of the braking action, thus losing the significance of providing the reaction transmitting means. A disadvantage also results that the area of contact between the reaction disc and the valve body is reduced, thus degrading the strength of the valve body.

SUMMARY OF THE INVENTION

In view of the foregoing, it is an object of the invention to provide a brake booster capable of providing a servo ratio of a required magnitude without increasing the outer diameter of a reaction disc even when the outer diameter of a spring, contained in the reaction transmitting means, is increased.

Specifically, the invention relates to a brake booster including a valve body slidably disposed within a shell, a valve mechanism mounted on the valve body, an input shaft for driving a valve plunger, which forms part of the valve mechanism, back and forth to thereby switch a flow path in the valve mechanism, an output shaft slidably disposed in the valve body, a reaction disc interposed between one end of the output shaft and the valve plunger, and reaction transmitting means interposed between the reaction disc and the valve plunger for transmitting a brake reaction from the reaction disc to the valve plunger and including a spring which is compressed when the brake reaction exceeds a preset load. In accordance with the invention, a holder is mounted on the valve body, and the reaction disc is disposed on the front side of the holder so that a brake reaction transmitted to the reaction disc is accepted by the valve body through the interposed holder. A plate plunger is slidably fitted with the holder so that a brake reaction transmitted to the reaction disc is transmitted to reaction transmitting means through the plate plunger.

With this construction, the brake reaction which is transmitted to the reaction disc is accepted by the valve body through the interposed holder, and is also transmitted to the reaction transmitting means through the plate plunger which is slidably fitted with the holder, to be subsequently transmitted to the valve plunger. The servo ratio is determined by the area of contact between the reaction disc and the holder and the area of contact between the reaction disc and the plate plunger. Accordingly, if the outer diameter of the spring in the reaction transmitting means is increased in order to achieve a preferred preset load, an optimum area of contact can be established between the reaction disc on one hand and the holder and the plate plunger on the other hand independently therefrom, allowing a preferred servo ratio to be freely established.

Above and other objects, features and advantages of the invention will become apparent from the following description of several embodiments thereof with reference to the drawings.

DETAILED DESCRIPTION OF THE EMBODIMENTS

Figure 1:
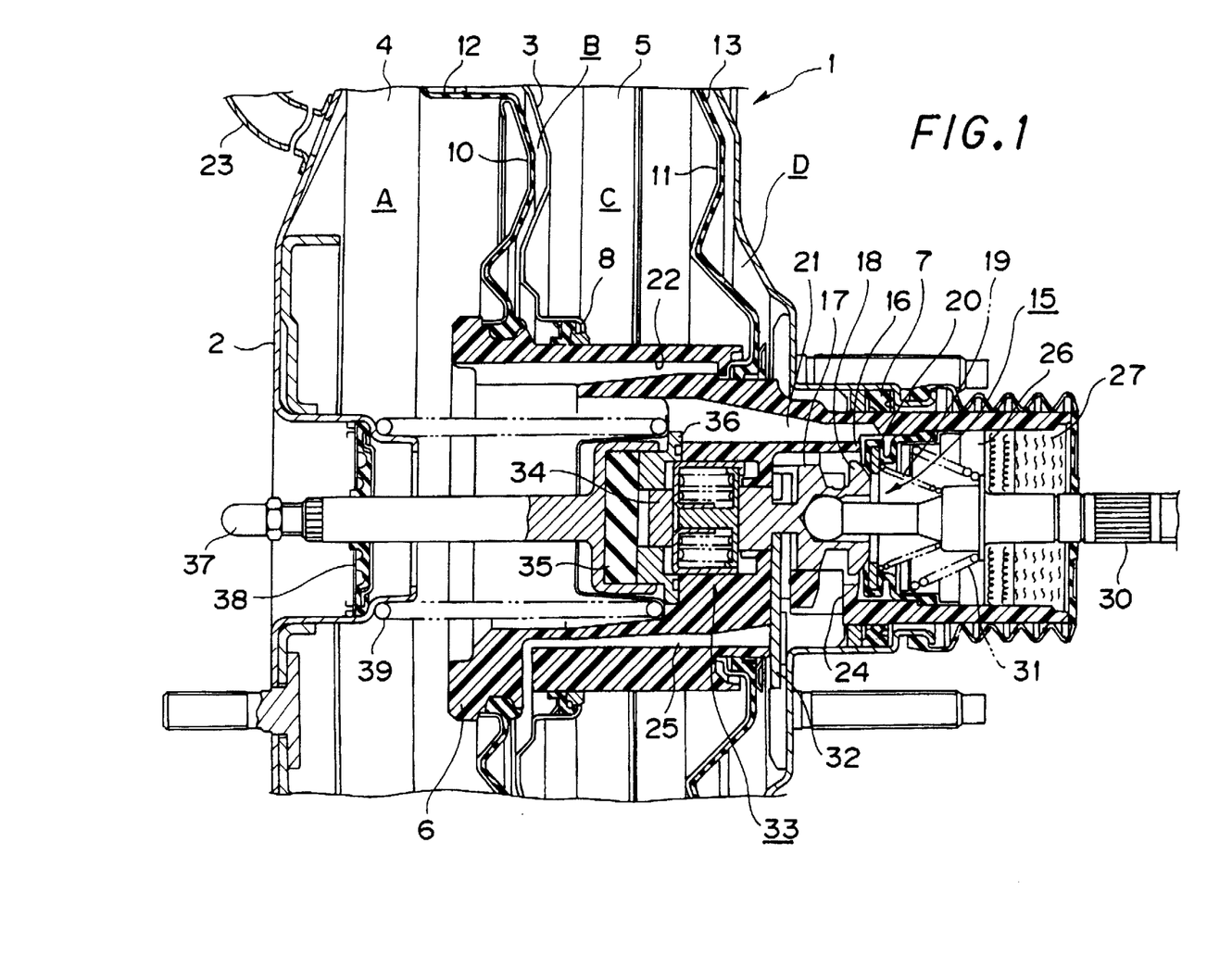
FIG. 1 is a cross section of one embodiment of the invention.

Referring to the drawings, several embodiments of the invention will now be described. Referring to FIG. 1, a brake booster of tandem type 1 includes a shell 2, the interior of which is partitioned by a centerplate 3 into a front chamber 4 and a rear chamber 5. A tubular valve body 6 slidably extends through the rear part of the shell 2 and the centerplate 3 where a hermetic seal is maintained by seal means 7, 8, respectively.

A front power piston 10 and a rear power piston 11 are connected around the outer periphery of the valve body 6 at locations which are disposed within the front chamber 4 and the rear chamber 5, respectively, and a front diaphragm 12 and a rear diaphragm 13 are applied to the back surfaces of the power pistons 10 and 11, respectively. A constant pressure chamber A and a variable pressure chamber B are defined across the front diaphragm 12 within the front chamber 4 while a constant pressure chamber C and a variable pressure chamber D are defined across the rear diaphragm 13 within the rear chamber 5.

The valve body 6 contains a valve mechanism 15 which switches a communication between the constant pressure chambers A, C and the variable pressure chambers B, D. Specifically, the valve mechanism 15 comprises an annular first valve seat 16 formed on the valve body 6, an annular second valve seat 18 disposed radially inward of the first valve seat 16 and formed on the rear portion of a valve plunger 17 which is slidably disposed in the valve body 6, and a valve element 20 which is urged to be seated upon either valve seat 16 or 18 under the influence of a poppet return spring 18.

A space located radially outward of an annular seat defined by the valve element 19 which moves into engagement with or disengagement from the first valve seat 16 communicates with the constant pressure chamber A through a first constant pressure passage 21 formed in the valve body 6, the interior of which communicates with the constant pressure chamber C through a second constant pressure passage 22. The constant pressure chamber A communicates with a source of negative pressure, not shown, through a conduit 23, whereby the negative pressure is normally introduced into the both constant pressure chambers A and C.

A space located radially inward of the annular seat defined by the combination of the first valve seat 16 and the valve element 20 and radially outward of another seat defined by the valve element 20 which moves into engagement with or disengagement from the second valve seat 18 communicates with the variable pressure chamber D through a radially extending first variable pressure passage 24 formed in the valve body 6, and the variable pressure chamber D communicates with the variable pressure chamber B through a second variable pressure passage 25 formed in the valve body 6.

Finally, a space located radially inward of the annular seat defined by the combination of the second valve seat 18 and the valve element 20 communicates with the atmosphere through a pressure passage 26 formed in the valve body 6 and a filter 27 disposed therein.

The right end of the valve plunger 17 is pivotally connected with a distal end of an input shaft 30, and a valve return spring 31 having a greater resilience than the poppet return spring 19 is disposed between the input shaft 30 and the valve body 6, thus normally maintaining the valve element 20 seated upon the second valve seat 18 on the valve plunger 17 while maintaining the valve element 20 away from the first valve seat 16 on the valve body 6. The other end of the input shaft 30 is coupled to a brake pedal, not shown.

A key member 32 prevents a disengagement of the valve plunger 17 from the valve body 6. The key member 32 is movable back and forth in the axial direction of the valve body 6, and when the brake booster is inoperative, it abuts against the internal surface of the shell 2 to maintain the valve plunger 17 at an advanced position relative to the valve body 6, thus reducing a lost motion of the input shaft 30 at the commencement of operation of the brake booster.

Reaction transmitting means 33, a plate plunger 34 and a reaction disc 35, all of which will be described in detail later, are sequentially disposed forwardly of the valve plunger 17. The plate plunger 34 is slidably fitted in a holder 36 which is fixedly mounted on the front end face of the valve body 6 in a hermetically sealed manner. The reaction disc 35 is received in a recess formed in one end of an output shaft 37. The recess formed in one end of the output shaft 37 is slidably fitted around the outer peripheral surface of the holder 36, and the front end of the output shaft 37 projects externally of the shell 2 for connection with a piston of a master cylinder, not shown, while maintaining a hermetic seal by means of a seal member 38.

Accordingly, a brake reaction which is transmitted from the piston of the master cylinder is transmitted to the reaction disc 35 through the output shaft 37, and is then accepted by the valve body 6 through the holder 36, and is also transmitted to a brake pedal, not shown, through the plate plunger 34, the reaction transmitting means 33, the valve plunger 17 and the input shaft 30.

Figure 2:
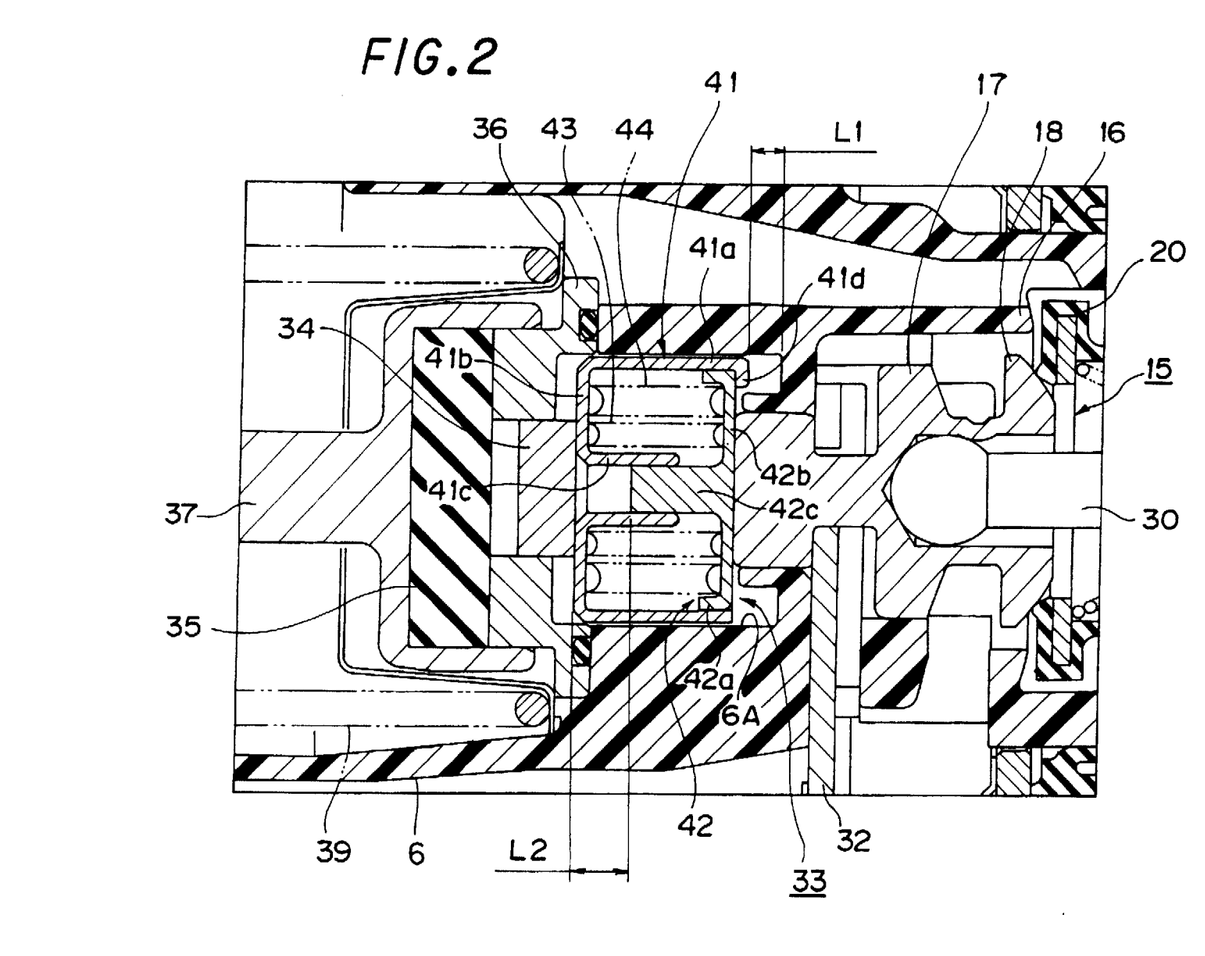
FIG. 2 is an enlarged section illustrating an essential part of the invention.

As shown to an enlarged scale in FIG. 2, the reaction transmitting means 33 is provided with a first retainer 41, a second retainer 42, and a pair of coiled springs 43, 44 which are concentrically disposed between the both retainers 41 and 42.

The first retainer 41 includes an outer tubular portion 41a which is slidably fitted into a bore of a large diameter 6A formed in the valve body 6, a radial portion 41b extending radially inward from the front end of the tubular portion 41a and disposed in abutment against the rear end face of the plate plunger 34, and an inner tubular portion 41c extending from the inner periphery of the radial portion 41b axially rearward.

On the other hand, the second retainer 42 includes an outer tubular portion 42a which is slidably fitted into the outer tubular portion 41a of the first retainer 41, a radial portion 42b extending radially inward from the rear end of the outer tubular portion 42a and disposed in abutment against the front end face of the valve plunger 17, and a projection 42c extending forwardly from the center of the radial portion 42b to be slidably fitted into the inner tubular portion 41c of the first retainer 41.

The pair of coiled springs 43, 44 are disposed between the radial portion 41b of the first retainer 41 and the radial portion 42b of the second retainer 42, and the both retainers 41, 42 and the coiled springs 43, 44 are integrally assembled together by bringing a detent 41d formed at the rear end of the outer tubular portion 41a of the first retainer 41 into abutment against the radial portion 42b of the second retainer 42 under the condition that the both coiled springs 43, 44 are compressed to a degree.

In the inoperative condition of the brake booster 1, when the radial portion 42b of the second retainer 42 is disposed in abutment against the front end face of the valve plunger 17, a clearance L1 is formed between the detent 41d on the first retainer 41 and the opposing portion of the valve body 6. Under this condition, a clearance L2 is formed between the plate plunger 34 which is disposed in abutment against the radial portion 41b of the first retainer and the projection 42c of the second retainer 42. The clearance L2 is chosen to be greater than the clearance L1 so that the detent 41d of the first retainer 41 can be brought into abutment against the mating portion of the valve body 6 before the plate plunger 34 abuts against the projection 42c of the second retainer 42.

In the described arrangement, when a brake pedal is depressed to drive the input shaft 30 and the valve plunger 17 forward, the reaction transmitting means 33 is integrally driven forward while maintaining the condition illustrated in FIG. 2 to drive the plate plunger 34 forward until the force of depression exceeds the load which is preset in the pair of coiled springs 43, 44.

As the valve plunger 17 is driven forward, a flow path in the valve mechanism 15 is switched to introduce the atmosphere into the variable pressure chamber B in the similar manner as in a conventional brake booster, whereby a pressure differential between the constant pressure chamber A and the variable pressure chamber B drives the power pistons 10, 11 and the valve body 6 forward and in turn drives the output shaft 37 forward, thus causing a braking liquid pressure to be generated in the master cylinder.

A brake reaction which results from the braking liquid pressure is transmitted through the output shaft 37 to the reaction disc 35, and is thence transmitted to the brake pedal through the plate plunger 34, the first retainer 41 of the reaction transmitting means 33, the pair of coiled springs 43, 44, the second retainer 42, the valve plunger 17 and the input shaft 30. A resulting relationship between an output of the brake booster 1 and an input or the force of depression is graphically illustrated by a line segment A shown in FIG. 3.

Subsequently, when the force of depression applied to the brake pedal increases under the condition mentioned above and hence the output from the brake booster 1 increases, the brake reaction increases in a corresponding manner. When the reaction exceeds the preset load upon the pair of coiled springs 43, 44, the both coiled springs 43, 44 are compressed to cause the second retainer 42 to move forward relative to the first retainer 41 (point B in FIG. 3).

As the coiled springs 43, 44 are compressed, the resulting forward movement of the second retainer 42 and the valve plunger 17 causes the output from the brake booster 1 to rise at a servo ratio (line segment C in FIG. 3) which is greater than the servo ratio indicated by the inclination of the line segment A. The inclination of the line segment C or the servo ratio can be freely established by suitably choosing spring constants for the pair of coiled springs 43, 44.

Figure 3:
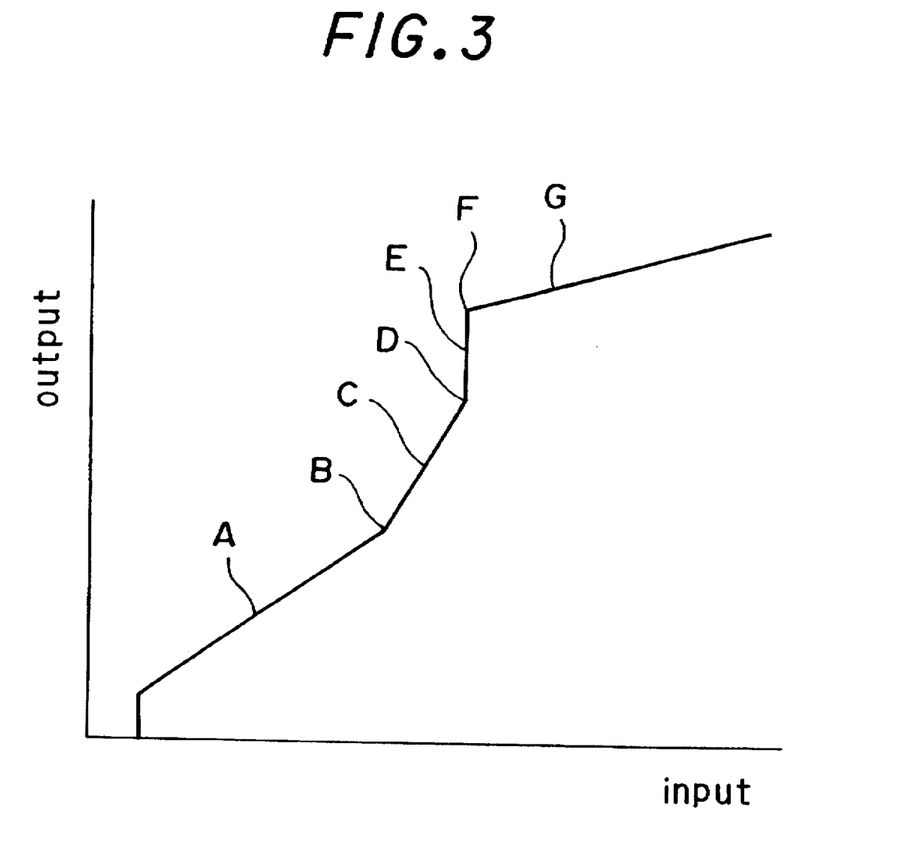
FIG. 3 graphically shows a characteristic of the embodiment.

While the second retainer 42 and the valve plunger 17 will be advanced relative to the first retainer 41, the position of the valve plunger 17 in a servo balance condition or the position which allows the valve element 20 to be seated simultaneously upon the first valve seat 16 and the second valve seat 18 is substantially fixed with respect to the valve body 6, and accordingly, in practice, the first retainer 41 will be retracted relative to the second retainer 42 and the valve plunger 17.

When the coiled springs 43, 44 continue to be compressed, the detent 41d of the first retainer 41 abuts against the valve body 6 (point D in FIG. 3). Thereupon, the entire brake reaction which has been transmitted from the plate plunger 34 to the valve plunger 17 through the rear action transmitting means 33 is accepted by the valve body 6, and accordingly, the brake reaction which has been transmitted to the valve plunger 17 ceases to increase.

As a consequence, if the brake pedal is further depressed, the brake reaction cannot exceed a given value, and it is no longer possible to push back the valve plunger 17 relative to the valve body 6, and the atmosphere continues to be introduced into the variable pressure chamber B to allow the output to be increased without increasing the force of depression (line segment E in FIG. 3) until the brake booster 1 reaches eventually a full load condition (point F in FIG. 3).

When the clearance L2 between the plate plunger 34 and the projection 42c of the second retainer 42 is reduced to zero in response to the depression of the brake pedal, thus causing an abutment of the plate plunger 34 against the projection 42c, the force of depression applied to the brake pedal is transmitted to the output shaft 37 from the valve plunger 17 through the projection 42c of the second retainer 42, the plate plunger 34 and the reaction disc 35, causing the output from the brake booster 1 to increase at a ratio of 1:1 with respect to an increase in the force of depression applied to the brake pedal (line segment G in FIG. 3).

In the above embodiment, the point B shown in FIG. 3 can be freely established by changing the preset load upon the pair of coiled springs 43, 44.

Since the reaction transmitting means 33 can be previously assembled, what is required during the assembly of the brake booster is to dispose the reaction transmitting means 33 at a given location, thus facilitating the assembly operation of the brake booster.

Figure 4:
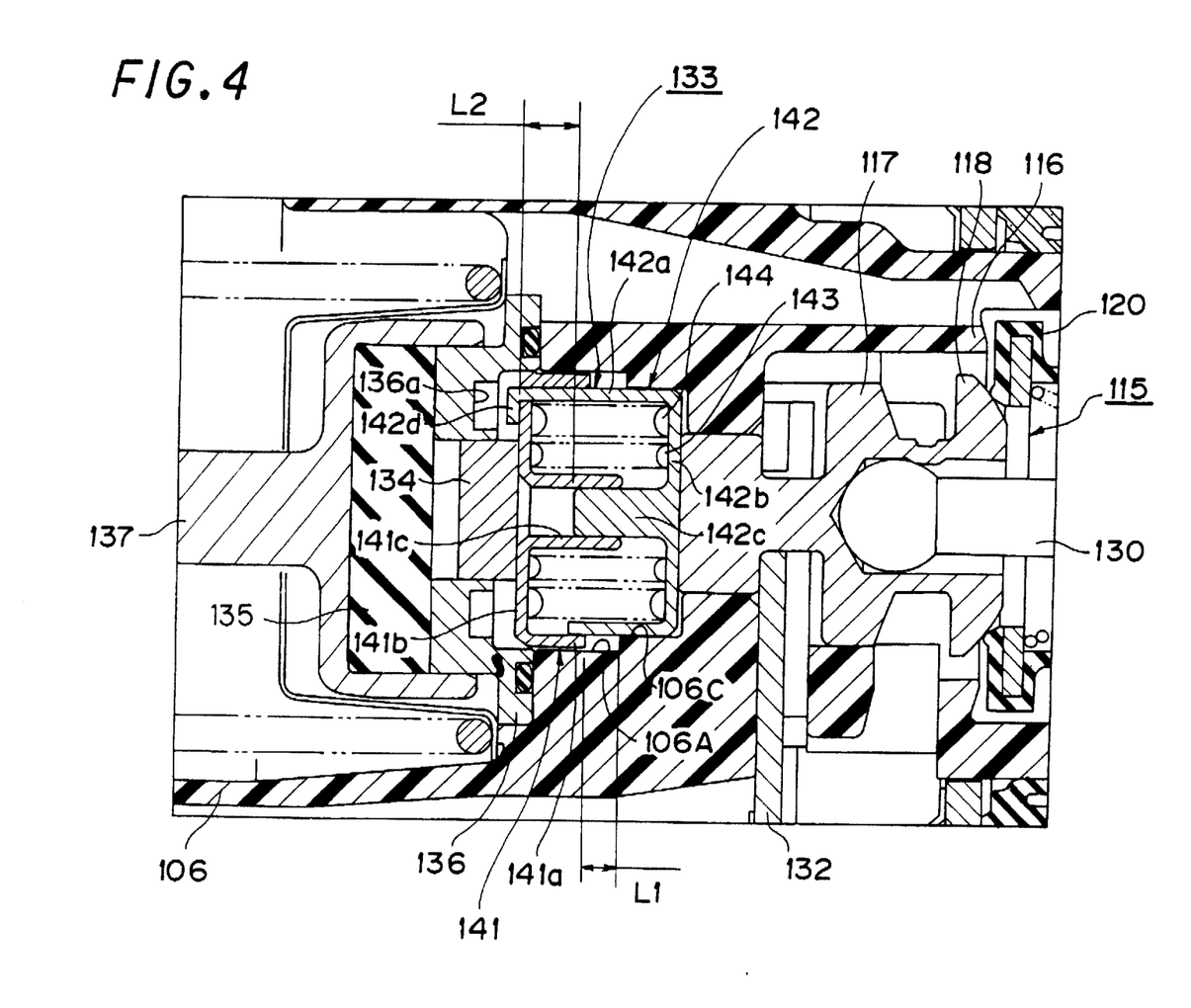
FIG. 4 is a cross section of a second embodiment of the invention.

FIG. 4 shows a second embodiment of the invention. As compared with the first embodiment, in the present embodiment, the overall length of an outer tubular portion 141a of a first retainer 141 is reduced, and a member corresponding to the detent 41d disposed at the rear end of the outer tubular portion 41a in the first embodiment is omitted. On the other hand, the overall length of an outer tubular portion 142a of a second retainer 142 is increased, and the outer tubular portion 142a is slidably fitted into the outer tubular portion 141a of the first retainer 141, with a detent 142d corresponding to the detent 41d being formed at the front end of the second retainer 142.

The detent 142d extends forwardly from the outer tubular portion 142a of the second retainer 142 and extends through a radial portion 141d of the first retainer 141 and is then folded radially inward. A plurality of such detents 142d are provided at an equal interval circumferentially of the outer tubular portion 142a.

A pair of inner coiled spring 143 and outer coiled spring 144 are concentrically disposed between the radial portion 141b of the first retainer 141 and a radial portion 142b of the second retainer 142.

A clearance L1 is formed between the rear end face of the outer tubular portion 141a of the first retainer 141 and its abutting portion on a valve body 106. In the present embodiment, this abutting portion is provided as a step between a bore 106A of a larger diameter formed in the valve body 106 in which the outer tubular portion 141a of the first retainer 141 is loosely fitted and a bore 106C of an intermediate diameter formed in the valve body 106 in which the outer tubular portion 142a of the second retainer 142 is slidably fitted. As in the first embodiment, a clearance L2 which is formed between a plate plunger 134 which abuts against a radial portion 141b of the first retainer 141 and a projection 142c of the second retainer 142 is chosen to be greater than the clearance L1.

In its rear end face, a holder 136 is formed with a relieved area 136a, which prevents a contact of the detent 142d of the second retainer 142 with the holder 136 from occurring.

In other respects, the arrangement is similar to that of the first embodiment, and major parts similar to those shown in the first embodiment are designated by like reference numerals as used in the first embodiment, to which 100 is added. It will be apparent that the second embodiment functions in the similar manner as the first embodiment.

Figure 5:
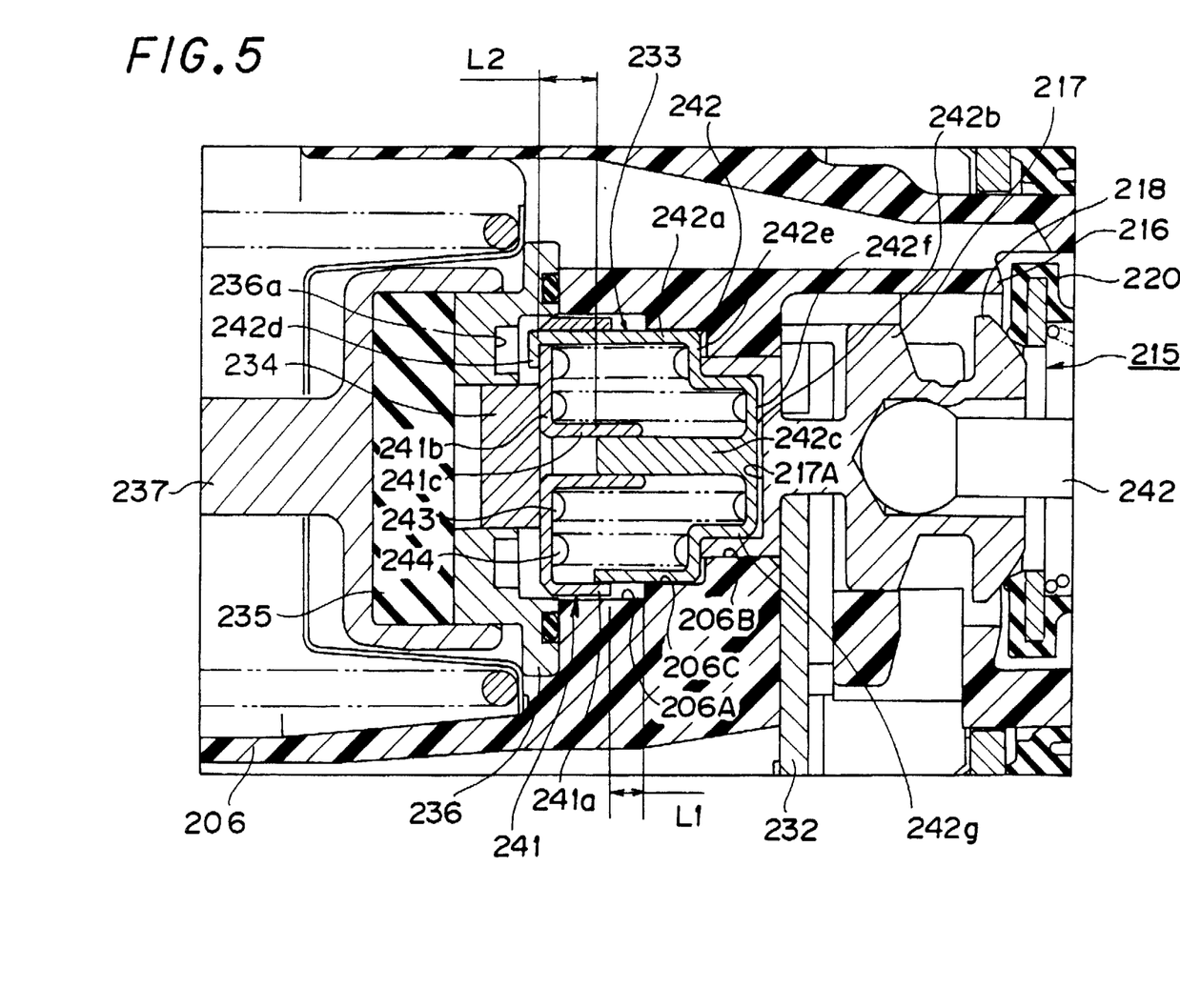
FIG. 5 is a cross section of a third embodiment of the invention.

FIG. 5 shows a third embodiment of the invention. While the radial portion 142b of the second retainer 142 is formed flat in the second embodiment, a second retainer 242 of the present embodiment includes a radial portion 242b which comprises an outer front portion 242e, an inner rear portion 242f located rearward of the front portion 242e and a tubular portion 242g which connects between the front portion 242e and the rear portion 242f.

An outer coiled spring 244 is disposed between a radial portion 241b of a first retainer 241 and the front portion 242e of the second retainer 242, and an inner coiled spring 243 is disposed between the radial portion 241b of the first retainer 241 and the rear portion 242f of the second retainer 242.

Additionally, in the present embodiment, the front end face of a valve plunger 217 is formed with a fitting opening 217A, which receives the rear portion 242f and the tubular portion 242g of the second retainer 242.

In other respects, the arrangement is similar to that of the second embodiment, and except for clearances L1, L2, similar parts to those shown in the second embodiment are designated by like reference numerals as used in the second embodiment, to which 100 is added.

In the third embodiment, the length of the inner coiled spring 243 can be increased as compared with the previous embodiment, affording a greater freedom of choice for the spring constant or material of the coiled spring 243 and thus facilitating the design.

Figure 6:
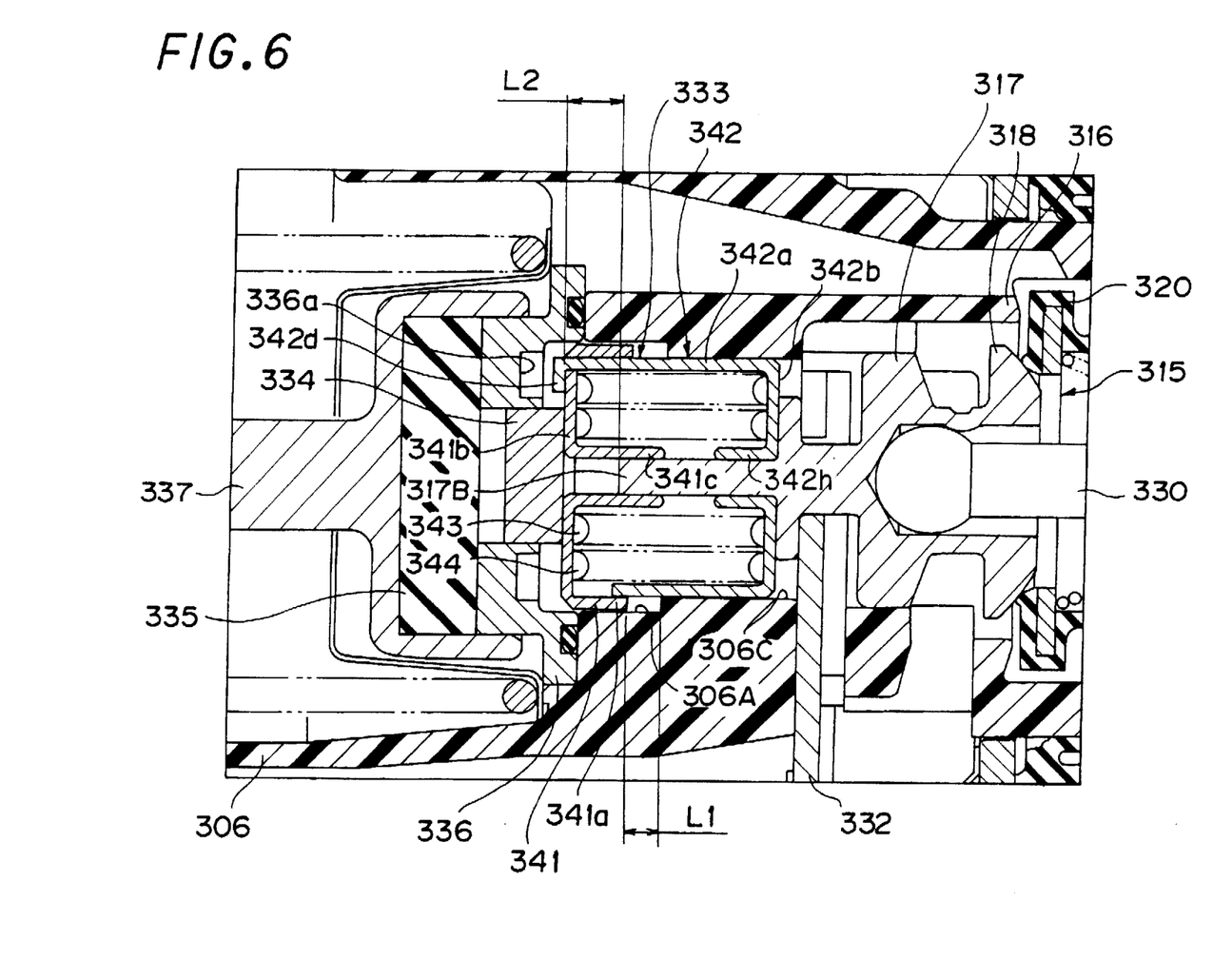
FIG. 6 is a cross section of a fourth embodiment of the invention.

FIG. 6 shows a fourth embodiment of the invention. In the present embodiment, the projection 142c from the radial portion 142b of the second retainer 142 shown in the second embodiment is omitted, and in its place, an inner tubular portion 342h having the same diameter as an inner tubular portion 341c of a first retainer 341 projects forwardly.

In addition, a projection 317B extends forwardly from the front end face of a valve plunger 317 in its axial portion, and slidably extends through the inner tubular portion 342h of the second retainer 342 and is slidably fitted with the inner tubular portion 341c of the first retainer 341.

In other respects, the arrangement is similar to that of the second embodiment, and except for clearances L1, L2, similar parts to those shown in the second embodiment are designated by like reference numerals as used in the description of the second embodiment, to which 200 is added.

Figure 7:
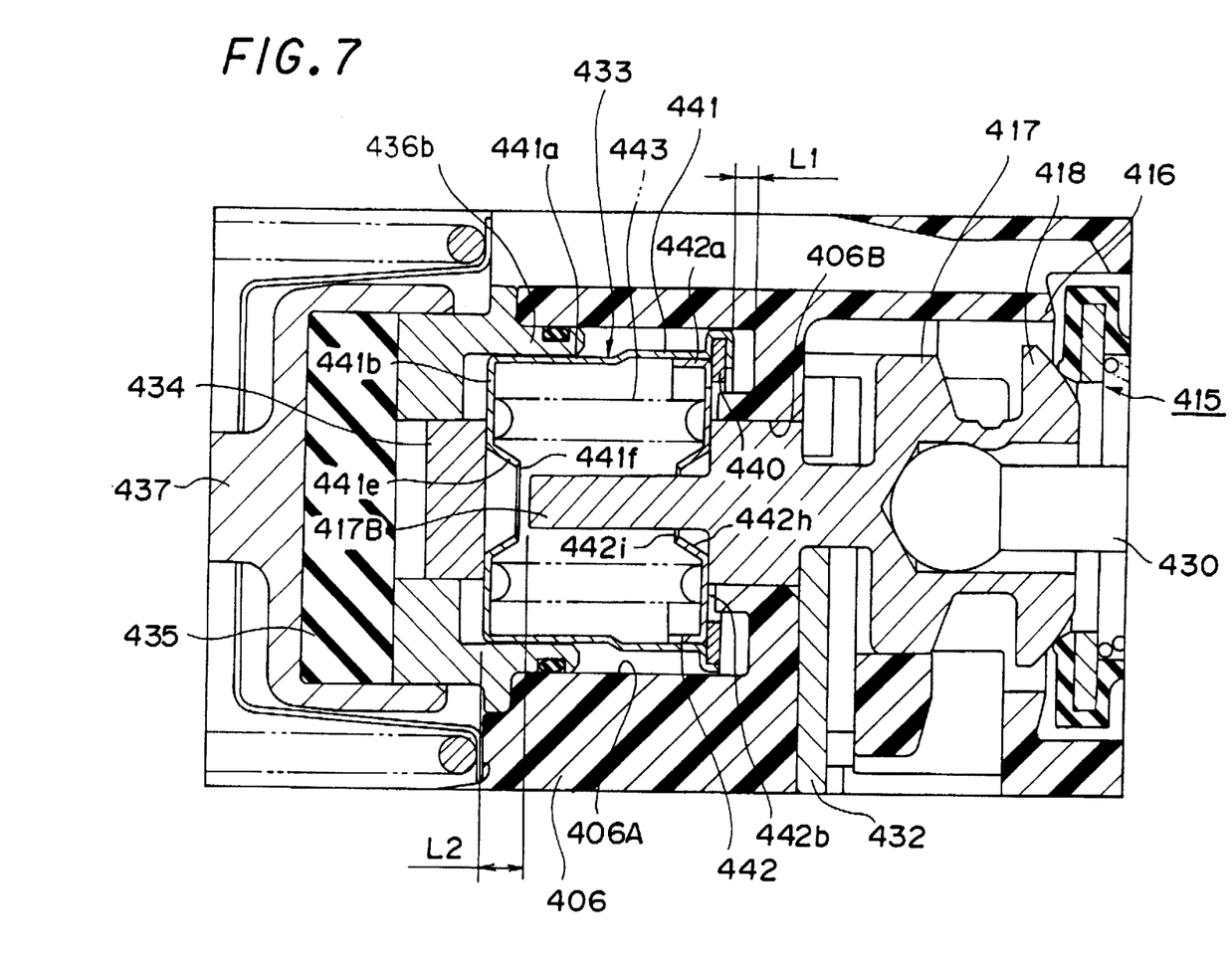
FIG. 7 is a cross section of a fifth embodiment of the invention.

FIG. 7 shows a fifth embodiment of the invention in which the number of coiled springs, which are two in the first to the fourth embodiment, is reduced to one.

In the present embodiment, a holder 436 is formed at its rear end with a tubular portion 436b which extends into a bore 406A of a larger diameter formed in a valve body 406, and an outer peripheral tubular portion 441a of a first retainer 441 has its end slidably fitted into the tubular portion 436b.

The first retainer 431 comprises the outer tubular portion 441a which is stepped to provide a reduced diameter toward the front end, a radial portion 441b extending radially inward from the front end of the outer tubular portion 441a, and a fold-back 441e which extends rearwardly in a tapered manner from the inner periphery of the radial portion 441b, the tapered fold-back 441 providing a rear opening 441f through which a projection 417B of a valve plunger 417 passes.

On the other hand, a second retainer 442 comprises an outer tubular portion 442a which is slidably fitted into the rear portion having a greater diameter of the outer tubular portion 441a of the first retainer 441, a radial portion 442b extending radially inward from the rear end of the outer tubular portion 442a and a tapered fold-back 442h extending forwardly from the inner periphery of the radial portion 442b, with the projection 417B of the valve plunger 417 extending through an opening 442i defined by the tapered fold-back 442h.

An annular stop 440 is attached to the rear portion of the outer tubular portion 441a of the first retainer 441 by caulking, and prevents the disengagement of the second retainer 442 from within the first retainer 441. A coiled spring 443 is disposed between the radial portion 441b of the first retainer 441 and the radial portion 442b of the second retainer 442 for normally maintaining the radial portion 442b of the second retainer 442 in abutment against the stop 440 on the first retainer 441.

In other respects, the arrangement is similar to that of the fourth embodiment, and except for clearances L1, L2, similar parts to those shown in the fourth embodiment are designated by like reference numerals as used in the fourth embodiment, to which 100 is added.

Figure 8:
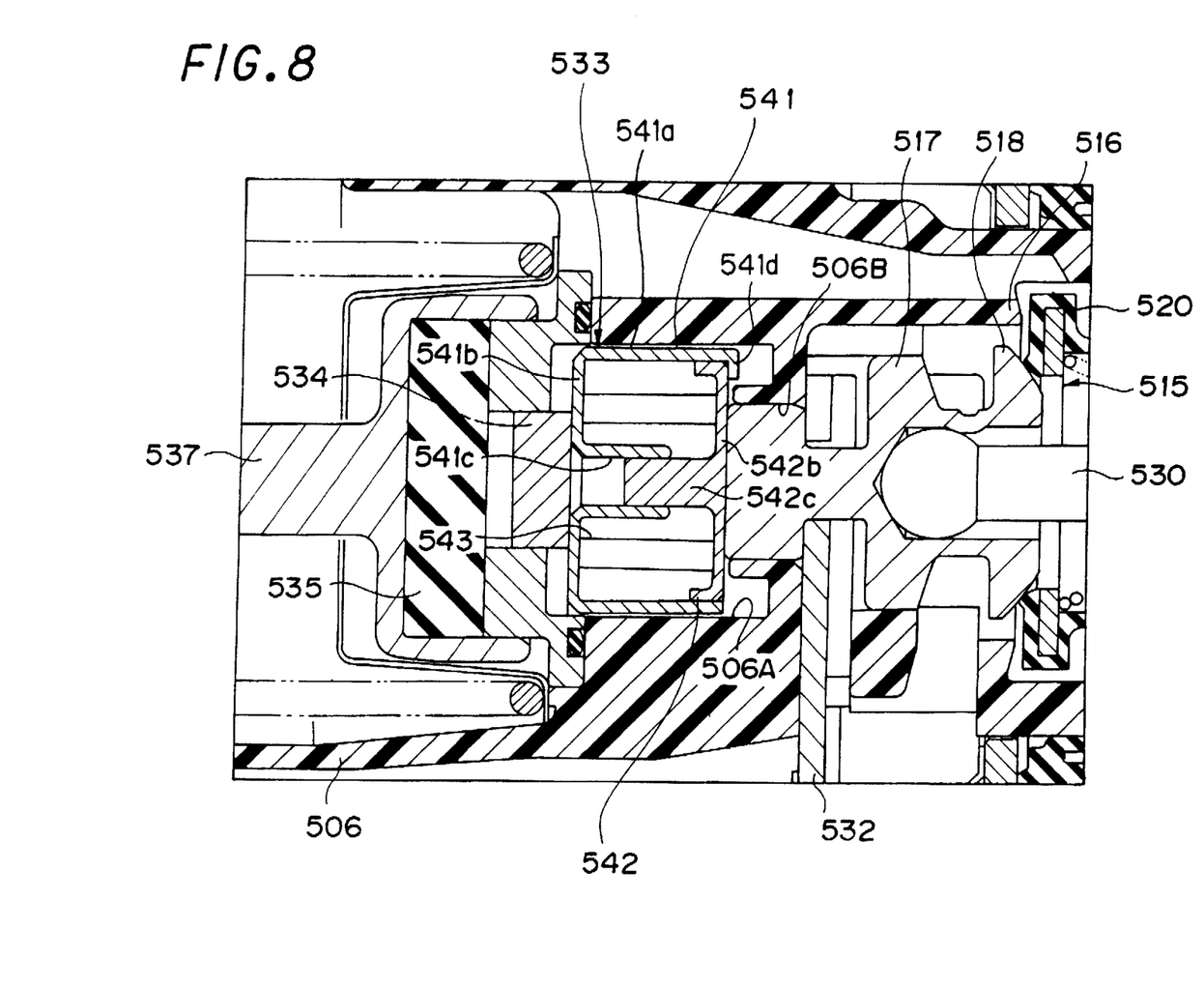
FIG. 8 is a cross section of a sixth embodiment of the invention.
Figure 9:
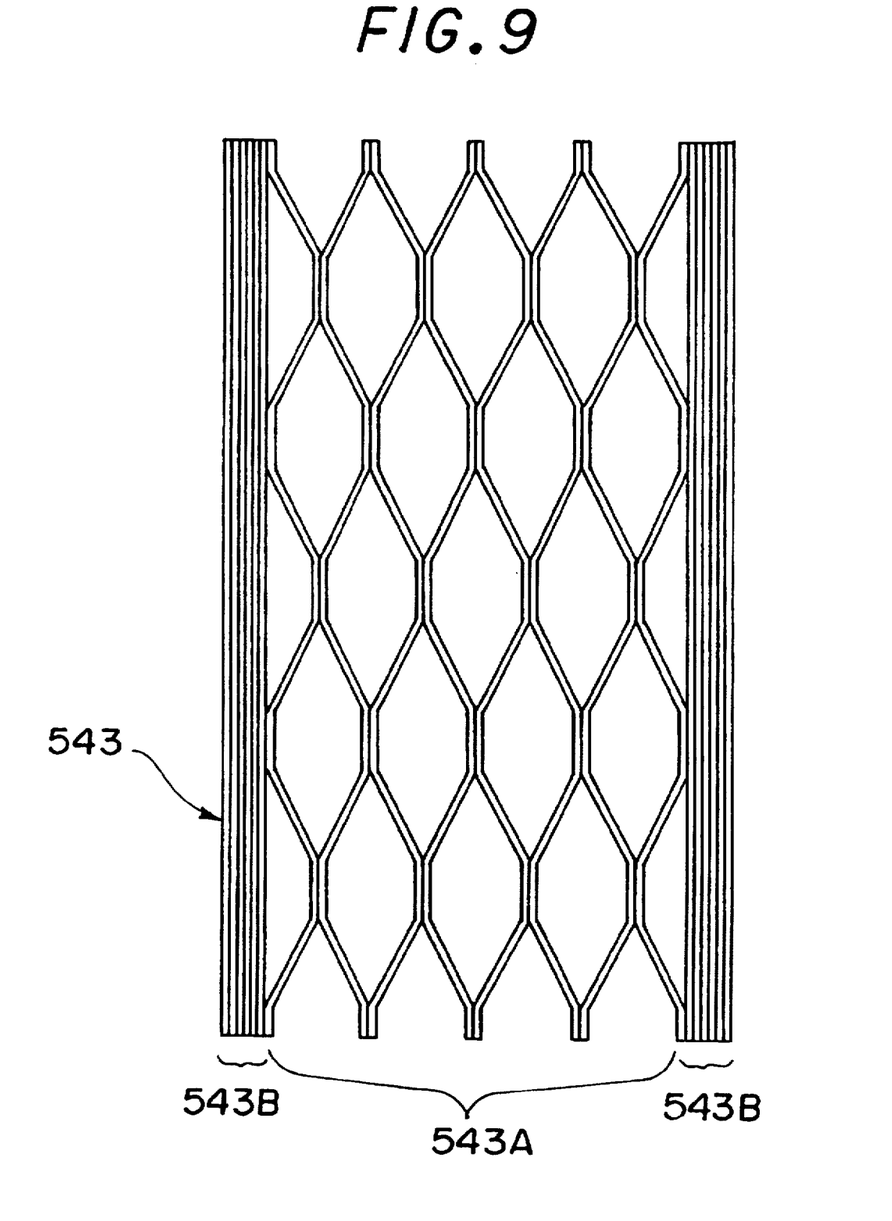
FIG. 9 is an enlarged view showing coiled waved spring 543.

FIG. 8 shows a sixth embodiment of the invention in which the pair of coiled springs 43, 44 used in the first embodiment is replaced by a single coiled waved spring 543. The coiled waved spring 543 is generally cylindrical in configuration, and as shown in FIG. 9, comprises an expansible section 543A formed from a strip spring material which is worked into waved configuration and which is wound into a multiple cylindrical winding and a pair of end turn sections 543B which continue to the opposite ends of the expansible section 543a and which are worked from a flat strip spring material worked into multiple cylindrical windings. The coiled waved spring 543 allows a higher spring constant to be established as compared with a coiled spring, and is compact advantageously as compared with a coiled spring which exhibits the same spring constant.

In other respects, the arrangement is similar to that of the first embodiment, and major parts which are similar to those shown in the first embodiment are designated by like reference numerals as used in the first embodiment, to which 500 is added.

Figure 10:
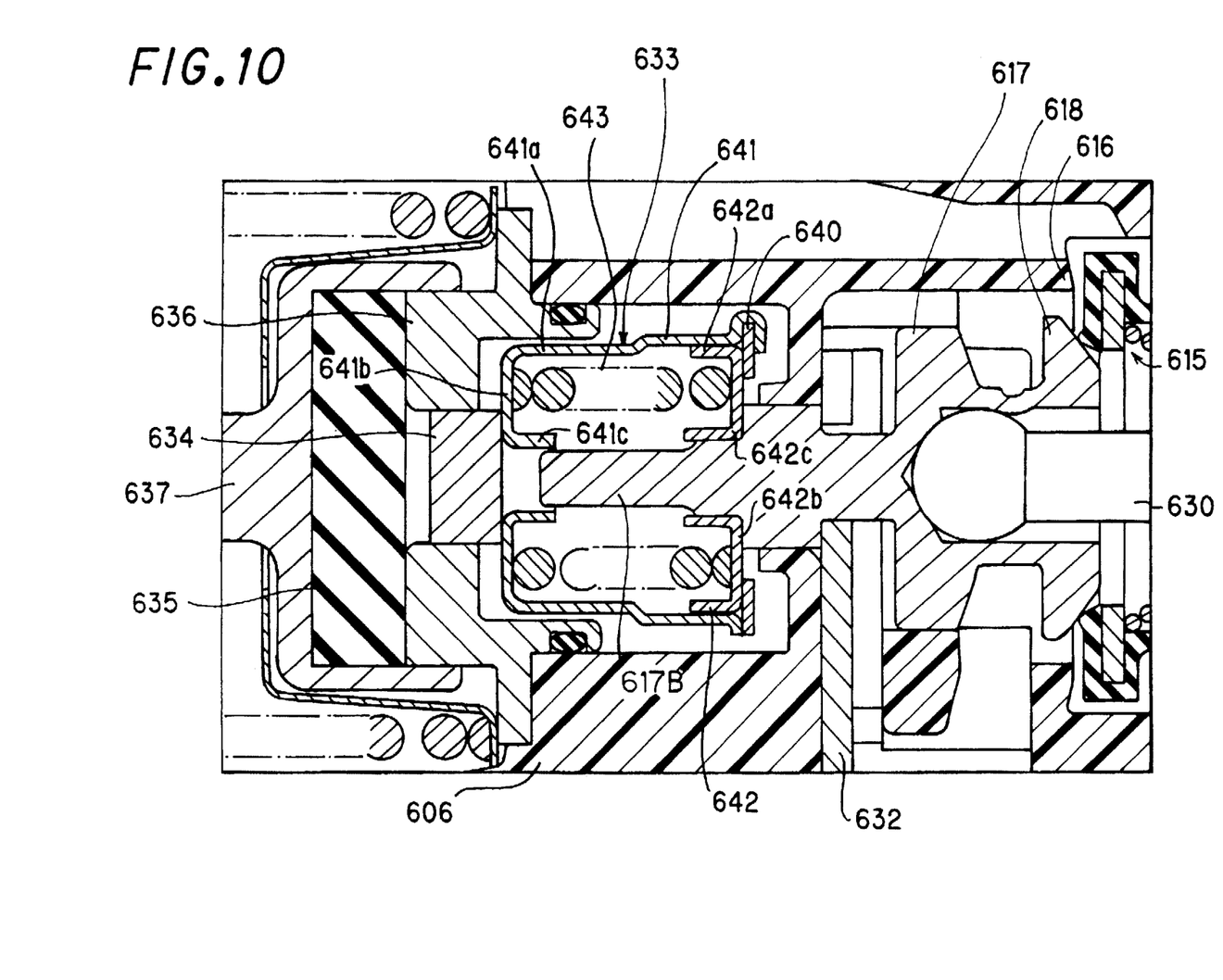
FIG. 10 is a cross section of a seventh embodiment of the invention.

FIG. 10 shows a seventh embodiment of the invention where the first retainer 441 and the second retainer 442 used in the fifth embodiment are replaced by a first retainer 641 and a second retainer 642 both of reduced external diameters, thus allowing the first retainer 641 and the second retainer 642 to be spaced from the inner peripheral surfaces of a valve body 606 and a holder 636.

In the present embodiment, the second retainer 642 includes a radial portion 642b, the inner periphery of which continues to an inner tubular portion 642c extending forwardly. A valve plunger 617 includes a projection 617B which is slidably fitted into the inner tubular portion 642c.

On the other hand, the first retainer 641 includes a radial portion 641b, the inner periphery of which continues to a rearwardly extending inner tubular portion 641c, into which the projection 617B of the valve plunger 617 is slidably fitted. The second retainer 642 also includes an outer tubular portion 642a which is slidably fitted into an outer tubular portion 641a of the first retainer 641.

In other respects, the arrangement is similar to that of the fifth embodiment, and corresponding parts to those shown in the fifth embodiment are designated by like reference numerals as used in the fifth embodiment, to which 200 is added.

In the present embodiment, during the operation of the brake booster, if the valve plunger 617 assumes a tilted position with respect to the valve body 606 as it is operated, the first retainer and/or the second retainer 642 cannot slide against or contact with the valve body 606 or the holder 636 since they are spaced from the latter, thus eliminating any likelihood of producing strange sound.

While the invention has been described above in connection with several embodiments thereof, it should be understood that a number of changes, modifications and substitutions therein are possible without departing from the spirit and scope of the invention defined by the appended claims.

What is claimed is:

1. A brake booster including a valve body slidably disposed within a shell, a valve mechanism disposed within the valve body, an input shaft for driving a valve plunger, which forms part of the valve mechanism, back and forth to switch a flow path in the valve mechanism, an output shaft slidably mounted on the valve body, a reaction disc interposed between one end of the output shaft and the valve plunger, and reaction transmitting means interposed between the reaction disc and the valve plunger for transmitting a brake reaction from the reaction disc to the valve plunger and including a spring which is compressed when the brake reaction exceeds a preset load;

the improvement wherein a holder is mounted on the valve body, the reaction disc being disposed forwardly of the holder so that the brake reaction transmitted to the reaction disc is accepted by the valve body through the holder, a plate plunger is slidably fitted into the holder for transmitting the brake reaction which is transmitted to the reaction disc to the reaction transmitting means through the plate plunger, the reaction transmitting means comprises first and second retainers mounted on the valve body so as to be displaceable thereon, and said spring disposed between the first and the second retainer and charged to a preset load to maintain both said retainers spaced apart, the brake reaction which is transmitted from the reaction disc is transmitted to the valve plunger through the first retainer, the spring and the second retainer, and the first retainer comprises an outer tubular portion, a radial portion extending radially inward from a front part of the outer tubular portion, and an inner tubular portion extending rearwardly from the inner periphery of the radial portion, and the second retainer comprises an outer tubular portion, a radial portion extending radially inward from a rear part of the outer tubular portion, and a projection extending forwardly from a central portion of the radial portion and slidably fitted into the inner tubular portion of the first retainer, the outer tubular portion of the first retainer and the outer tubular portion of the second retainer being fitted together so as to be slidable relative to each other, said spring being disposed between the radial portion of the first retainer and the radial portion of the second retainer, at least one of the outer tubular portions being provided with a detent which engages the other retainer to prevent both said outer tubular portions from being disengaged from each other.

2. A brake booster according to claim 1 in which the spring comprises a coiled waved spring.

3. A brake booster including a valve body slidably disposed within a shell, a valve mechanism disposed within the valve body, an input shaft for driving a valve plunger, which forms part of the valve mechanism, back and forth to switch a flow path in the valve mechanism, an output shaft slidably mounted on the valve body, a reaction disc interposed between one end of the output shaft and the valve plunger, and reaction transmitting means interposed between the reaction disc and the valve plunger for transmitting a brake reaction from the reaction disc to the valve plunger and including a spring which is compressed when the brake reaction exceeds a preset load;

the improvement wherein a holder is mounted on the valve body, the reaction disc being disposed forwardly of the holder so that the brake reaction transmitted to the reaction disc is accepted by the valve body through the holder, a plate plunger is slidably fitted into the holder for transmitting the brake reaction which is transmitted to the reaction disc to the reaction transmitting means through the plate plunger, the reaction transmitting means comprises first and second retainers mounted on the valve body so as to be displaceable thereon, and said spring disposed between the first and the second retainer and charred to a preset load to maintain both said retainers spaced apart, the brake reaction which is transmitted from the reaction disc is transmitted to the valve plunger through the first retainer, the spring and the second retainer, and wherein the first retainer comprises an outer tubular portion and a radial portion extending radially inward from a front part of the outer tubular portion, and the second retainer comprises an outer tubular portion, a radial portion extending radially inward from a rear part of the outer tubular portion, and an inner tubular portion projecting forwardly from a central part of the radial portion, a forwardly extending projection being formed on the front end of the valve plunger to be slidably fitted into the inner tubular portion of the second retainer, the outer tubular portion of the first retainer and the outer tubular portion of the second retainer being fitted together so as to be slidable relative to each other, said spring being disposed between the radial portion of the first retainer and the radial portion of the second retainer, at least one of the outer tubular portions being provided with a detent which engages the other retainer to prevent both said outer tubular portions from being disengaged from each other.

4. A brake booster including a valve body slidably disposed within a shell, a valve mechanism disposed within the valve body, an input shaft for driving a valve plunger, which forms part of the valve mechanism, back and forth to switch a flow path in the valve mechanism, an output shaft slidably mounted on the valve body, a reaction disc interposed between one end of the output shaft and the valve plunger, and reaction transmitting means interposed between the reaction disc and the valve plunger for transmitting a first portion of a brake reaction from the reaction disc to the valve plunger and including a spring which is compressed when the brake reaction exceeds a preset load;

the improvement wherein a holder is mounted on the valve body, the reaction disc being disposed forwardly of the holder so that the brake reaction transmitted to the reaction disc is accepted by the valve body through the holder, a plate plunger is slidably fitted into the holder for transmitting the brake reaction which is transmitted to the reaction disc to the reaction transmitting means through the plate plunger, the reaction transmitting means comprises first and second retainers mounted on the valve body so as to be displaceable thereon, and said spring is disposed between the first and the second retainer and charged to a preset load to maintain both said retainers spaced apart, the brake reaction which is transmitted from the reaction disc is transmitted to the valve plunger through the first retainer, the spring and the second retainer, and, when the spring is compressed to cause the first retainer to move relative to the valve body, the reaction transmitting means brings the first retainer into abutment against the valve body to transmit a second portion of the brake reaction which is transmitted from the reaction disc to the valve body through the first retainer.

* * * * *